United States Patent [19]
Henderson

[11] 3,989,270
[45] Nov. 2, 1976

[54] HITCH CONSTRUCTION
[76] Inventor: Charles R. Henderson, 255 W. 1st South, Vernal, Utah 84978
[22] Filed: Apr. 17, 1975
[21] Appl. No.: 568,921

[52] U.S. Cl. .............................. 280/478 A; 214/505
[51] Int. Cl.² ............................................ B60D 1/16
[58] Field of Search ........ 280/478 R, 478 A, 478 B, 280/479 R, 490 R, 490 A; 214/505

[56] References Cited
UNITED STATES PATENTS

| | | | |
|---|---|---|---|
| 2,170,983 | 8/1939 | Adams | 280/478 R |
| 2,340,786 | 2/1944 | Winn | 280/478 R |
| 2,938,642 | 5/1960 | Felix | 214/505 |
| 3,521,908 | 7/1970 | Carter | 280/479 R |

Primary Examiner—Robert R. Song
Assistant Examiner—R. Schrecengost

[57] ABSTRACT

An extensible and retractable, split hitch construction which offers articulative versatility in aligning the hitch with the ball or other hitch connection of a towing vehicle. Accordingly, rather than requiring an exact alignment of the trailer tongue with the tractor ball, for example, the tractor is merely brought in proximity with the hitch connection. Thereafter the tongue of the hitch is extended and pivoted as necessary to come into proper vertical alignment with the ball or other tractor connection. Means are provided in the hitch construction for the gradual application of brakes to the towed trailer where the same presses toward the tractor.

11 Claims, 8 Drawing Figures

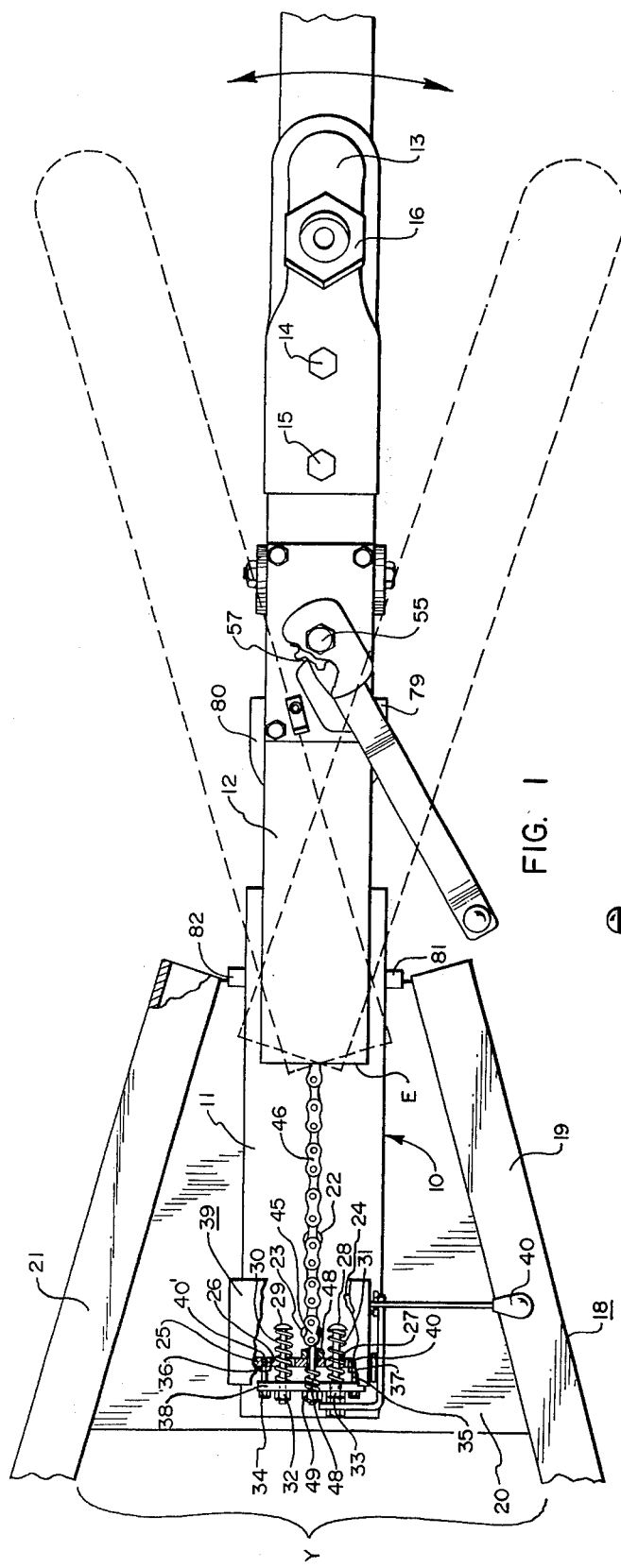

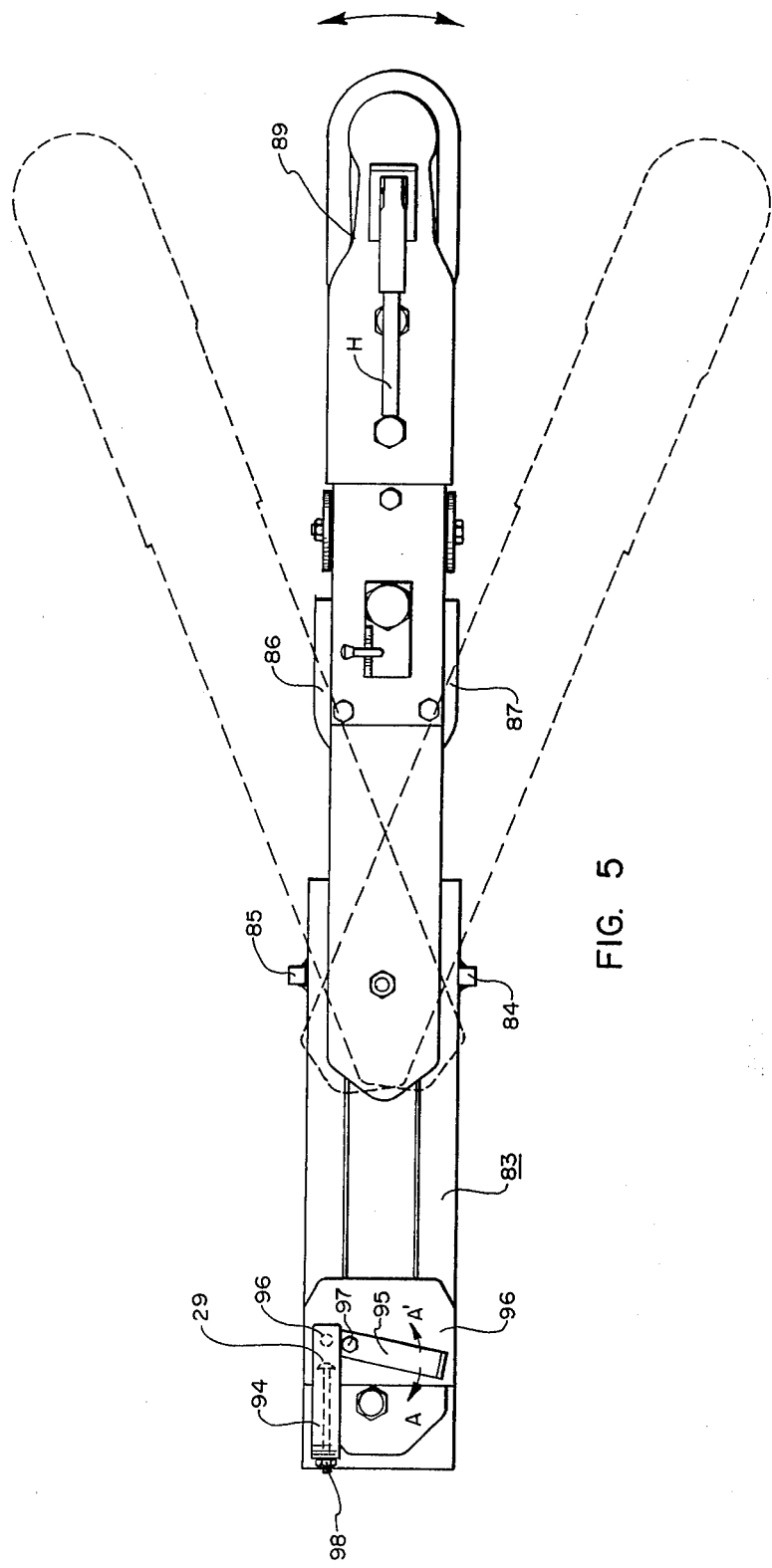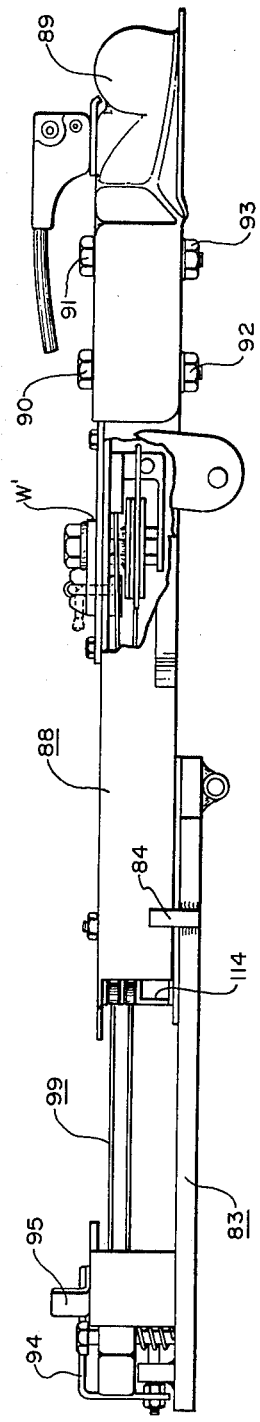
FIG. 5
FIG. 6

HITCH CONSTRUCTION

The present invention relates to trailer hitches and, more particularly, provides a new and improved, extensible and retractable, split-hitch construction for enabling rapid and easy alignment of the trailer connection end over the tractor hitch ball or other connection.

Persons who have had experience in coupling and uncoupling trailers, of any nature, from towing vehicles such as automobiles and trucks have noted the great time, attention, and considerable difficulty which are necessarily incurred in exactly aligning the ball of the towing vehicle underneath the socket connection of the hitch affixed to the trailer, or vice versa. Frequently, two people are involved and many "dry runs" incurred before the ball of the tractor or towing vehicle can be brought anywhere near to vertical alignment with the ball connection of the trailer hitch.

The present invention provides a split hitch construction whereby the towing vehicle need only be brought into proximity with the forward portion of the trailer. The hitch is designed so that the tongue portion thereof is extensible from the remainder of the hitch and is laterally pivotal in both directions, so that the socket of the hitch can be conveniently moved from right to left or fore and aft as necessary for proper alignment with the tractor ball. This, it is noted, can be done extremely conveniently without requiring any additional movement of either tractor or trailer. Once the socket connection of the hitch is brought into alignment with the ball of the tractor and is secured thereto, then it is simply necessary for the tongue and drawbar components of the hitch to be drawn together, as with the winch, and the two secured by a dead bolt or other means. Accordingly, the drawing together and alignment of the tongue and drawbar components of the invention require much less work, attention and time.

In the invention resilient abutment means is provided as well as shock absorber or resilient load-carrying means. In a preferred form of the invention, the spring-loaded abutment means supplied as between the drawbar and tongue is provided with lever means suitable for providing automatic actuation of the braking system of the trailer, should such trailer press fowardly too greatly against the towing vehicle, either in decelerations or braking of the latter, or for other reasons.

Accordingly, a principal object of the present invention is to provide a new and improved hitch construction for trailers.

An additional object is to provide an extensible and retractable, split hitch construction.

A further object is to provide an articulative hitch construction wherein the forward or tongue portion thereof can be elongated and moved from side to side so as to facilitate an easy alignment of the forward portion of the tongue relative to the hitch connection of the towing vehicle.

A further object is to provide a split hitch construction incorporating a winch, wherein the articulative tongue of the hitch may be drawn rearwardly in retracted position and held in proper alignment relative to the drawbar of the hitch.

A further object is to provide in a hitch construction a resilient load-carrying means, this such that when the tongue of the hitch is extended outwardly for subsequent connection to the ball of a towing vehicle, the tongue can still carry the load of the trailer forward of its forward axle.

A further object is to provide a winch provided split hitch construction wherein the winch cable or chain is provided with an automatic spring takeup feature when the tongue of the hitch is to be retracted relative to the drawbar thereof.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a top plan of the split hitch construction of the present invention, in a preferred form thereof, and is shown in extended condition relative to a V-trailer frame;

FIG. 2 is a side elevation of the FIG. 1 hitch when mounted on a straight trailer tongue;

FIG. 5 is a top plan of an alternate hitch in the invention;

FIG. 6 is a side elevation of the structure shown in FIG. 5, and

Figure 4A:
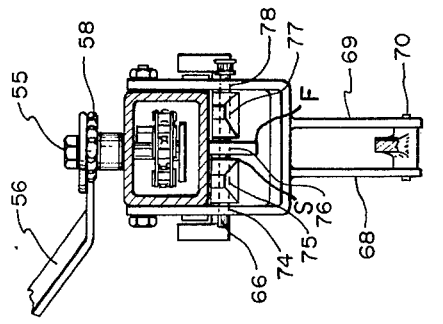
FIG. 4A is a transverse vertical section taken along the lines 4A—4A in FIG. 2.
Figure 4:
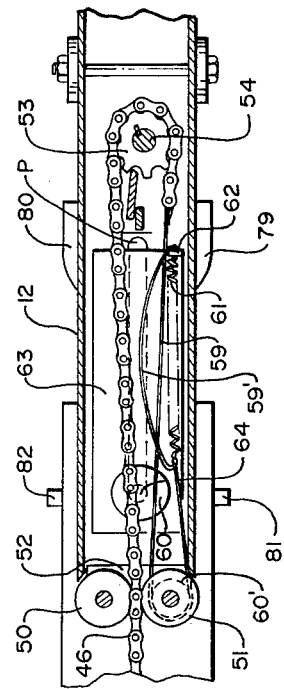
FIG. 4 is a fragmentary horizontal section, looking down, and is taken along the line 4—4 in FIG. 1.

In FIGS. 1 through 4A, an extensible and retractable split-hitch construction 10 is shown to be provided with a flat horizontal drawbar 11 and also a tongue 12. Tongue 12 is provided with a tractor connection 13, bolted in place by bolt attachments 14 and 15. This will generally take the form of a socket member having a ball lock 16 and constructed to receive ball 17 of the tractor, not shown. Trailer 18 is provided with a V-configured forward yoke Y having a plate 20 secured thereto as by welding. This plate may be secured either to the upper or to the lower flanges of channels 19 and 21 of such yoke. In any event, bolts or other attachments 22 and 23 are provided with suitable apertures, threaded or otherwise, for fixed connection of the drawbar 11 to plate 20 as indicated in FIG. 2.

An inverted U-configured strap 24 is provided with an end plate bracket 25 that is secured thereto. End plate bracket 25 is provided with a pair of apertures 26 and 27 which receive and pass carriage bolts and concentric springs 28–31, as shown in FIG. 1.

Bolts 28 and 29 are retained by nuts 32 and 33. Bolts 34 and 35 and lock nuts 36 and 37 are employed to secure plate 38 to end plate bracket 25. End plate bracket 25 may be provided with drilled and tapped apertures 40 and 40' for receiving these bolts.

Figure 3:
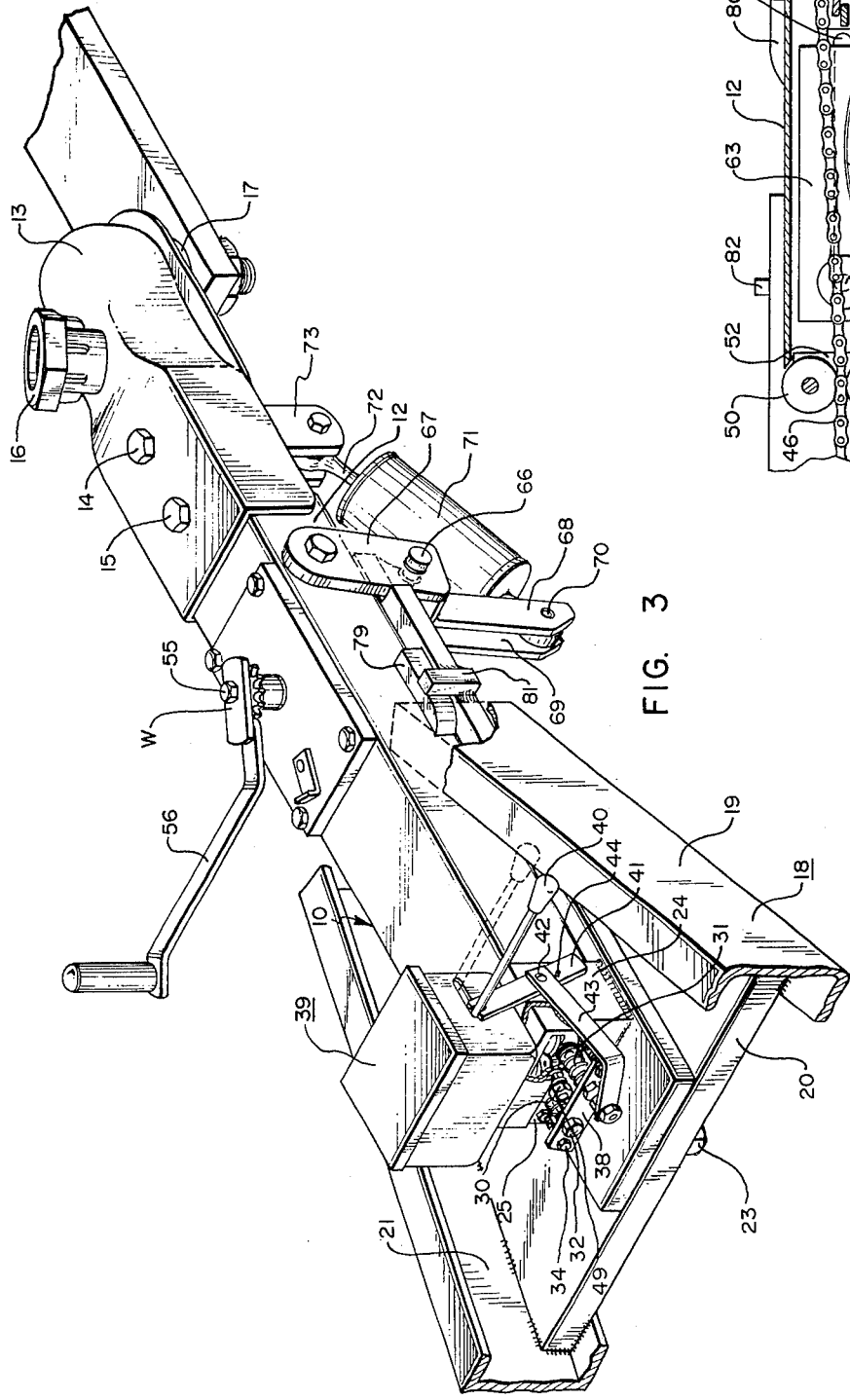
FIG. 3 is a perspective view of the structure of FIGS. 1 and 2 wherein the tongue has been withdrawn to retracted position relative to the drawbar portion of the hitch.

FIGS. 2 and 3 illustrate a braking structure 39 which is strictly conventional, an off-the-shelf item, and which is employed to actuate braking pressure to the wheels of the trailer. One such structure is known as an automatic brake controller, manufactured by Kelsey Products, Kelsey-Hayes, Kit No. 56943. The particular system involved and utilizing structure 39 is well known and not shown here. There are, of course, many types of braking systems, either electrical or hydraulic and optional or required by law wherein, should the trailer tend to move forwardly by law wherein, should the trailer tend to move forwardly more rapidly than the towing vehicle, the brakes will be applied automatically to the trailer.

In any event, such structures will generally have a lever 40 or similar spring-biased structure. In the construction as shown, it is seen that lever actuator 41 is pivoted by pivot screw 42 to lever 43, and that the latter is pivotally secured to bolt 28; fulcrum screw 44 is also employed, and coacts with lever 43 in pivotally mounting the same to strap 24.

Accordingly, as to the operation of the rear portion of the structure as shown to the left-hand side of FIG. 3, it is noted that where tongue pressure is applied by end E of tongue 12 rearwardly against the abutment means, i.e. bolts 28 and 29, there will be a rearward movement of bolt 29 and hence of lever or link 43. This action produces a rearward pulling of lever 41 about pivot pin 44 so as to urge the brake lever 40 rearwardly and thus progressively apply trailer brakes (not shown).

Therefore, it is seen that a rearward urging of the tongue 12 relative to the abutment means, namely the reaction bolts 28 and 29, will produce a simultaneous actuation of the lever system including levers 42 and 43 so as to produce a rearward urging of lever 40. These levers are standard and, again, are used simply for the purpose of actuating the mechanism 39 so as to apply, either electrically or hydraulically, and progressively, the brakes of the trailer.

It is also noted that a mounting stud 45, see FIG. 1, is affixed to chain 46 and passes through aperture 47. Nut 49 is secured to mounting stud 45 and backs compression spring 48, the latter serving as protective device in the event of excessive winch pressure.

Pulleys 50 and 51 are mounted upon bracket 52 which in turn is welded or otherwise secured to tongue 12. The chain 46 passes between the two idler pulleys 50 and 51 and wraps around sprocket 53 that is keyed to shaft 54. Shaft 54 in fact comprises the shank of bolt 55. Winch handle 56 may be provided with a conventional, one-way ratchet and pawl or hook connection at 57 and 58. These are provided in the conventional manner and such that the winch handle actively engages the ratchet and hence is keyed to the shaft only in one direction of revolvement of the handle. Thus, there will be no danger of handle revolvement when the tongue is pulled outwardly from the drawbar. Chain 46 is provided with an elongate connector 59 that loops around outer pulley 60 and is connected by a shunting tension spring 61 to a fixed post mount 62. Elongate connector portions 59', to which opposite ends of springs 61 are secured, prevent overstretch of such spring.

Plate 63 provides a lengthening mount for attachment of spring 61 to post 62, and is secured to stud 64 that is secured in place on drawbar 11 by securement nut 65. Stud or post 64 slides in tongue slot P, see FIG. 4. Tubular tongue 12, see FIG. 4A, has a vertical fin F that is guidingly received in axial elongate end slot S of drawbar 11, see also FIG. 2.

When the tongue is in fully retracted position relative to the drawbar, then dead bolt 66 is secured in place in the position shown in FIGS. 3 and 4A. In this connection, a lever member 67 is provided, is pivoted to tongue 12 by opposite pivot bolts R, see FIG. 3, and includes a pair of lever arms 68 and 69 which form a pivot connection 70 for a resilient load carrying means 71. The same may comprise a conventional shock absorber of the spring-and-piston or hydraulic-piston type. Extension 72 is connected to a clevis 73, the latter being supplied by plate 74 that is connected by bolts 14 and 15 to the tongue mount 13 as shown in FIG. 2. It is noted that the dead bolt 66 proceeds through apertures 74, 78. See FIG. 4A. The specific structure of the box-beam, tubular type tongue and the position of the dead bolt 66 is shown in detail in FIG. 4A. With the dead bolt withdrawn from its position as shown in FIG. 4A, for tongue withdrawal, then the resilient load-carrying means, or shock absorber is present to support the load of the tongue of the trailer immediately prior to the attachment of portion 13 to hitch ball 17.

FIGS. 1 and 2 illustrate that with the tongue mount 13 being disposed in reasonable proximity relative to the ball 17 of the tractor, then tongue 12 may be extended relative to drawbar 11 and even pivoted back and forth as shown by the dotted lines in FIG. 1, so that member or mount 13 may be aligned with ball 17; whereupon member 13 is lowered to engage the ball at 17 and the ball lock at 16 is tightened.

It is noted that a ball hitch is conventional in securing trailer hitch to the ball of a towing vehicle. Obviously any type of articulative connection such as a universal joint connection might be used in lieu of a ball. The same principles of the invention will apply.

In returning to FIGS. 3 and 4, it is seen that the tubular tongue 12 is provided with opposite cam-like pads 79 and 80 which are welded in position to the tongue. Coacting with these pads are posts 81 and 82 which are welded in place to the opposite sides of the flat horizontal drawbar member 11. These posts aid in the retraction of the tongue relative to the drawbar by insuring that the final retraction of the tongue is in a rectilinear or axial relationship relative to the drawbar. When, however, the tongue is extended such that the posts are disposed beyond the pads 79 and 80, then the tongue may be pivoted back and forth in accordance with the dotted line configuration shown in FIG. 1. Such an articulative feature of the tongue enables an easy coupling of the tongue relative to ball 17 in FIG. 2. Accordingly, there is effected in the split-hitch construction shown, not only the feature of an elongation of the tongue-drawbar combination, but also a pivotal displacement action of the tongue as shown by the dotted lines in FIG. 1 so that an easy coupling of the tongue relative to the tractor ball 17 may be facilitated. Upon return of the tongue end E to within strap 24 in FIG. 2, pulleys 50, 51 will aid in guiding such return.

The entire structure of W in FIG. 2 simply comprises a winch structure, with sprocket 53 associated with bushing D in FIG. 2 being the effective winch drum and the chain 46 being the winch elongate connector. The term "winch" and "winch drum" shall also be understood to include a capstan, as in FIG. 4 at 53; thus, the cable or chain end may either be wound on the "drum" and there terminate, or simply pass to external structure as in FIG. 4.

In FIGS. 5 and 6 drawbar 83 comprises, again, a horizontal flat drawbar provided with posts 84 and 85, similar to posts 81 and 82 in FIG. 3. Correspondingly, pads 86 and 87 are welded to tongue 88 in the manner shown in FIGS. 5 and 6. Tongue 88 is extensible anf withdrawable or retractable relative to drawbar 83 in the same manner as shown in connection with the tongue and drawbar combination of FIGS. 1 and 2.

Tongue 88 is provided at its forward extremity with a ball hitch receiver 89 that is bolted in place to the tongue by means of bolt and nut attachments 90–93.

The braking structure and system to the rear of FIGS. 5 and 6 is exactly the same as is shown in FIGS. 1 and 2 with the exception that this time levers 94 and 95 are provided, are pivoted together by blind pivot 96, and lever 95 this time includes a pivot connection 97 to fixed bracket 98, the latter being fixed securely to and made a part of drawbar 83. This time, abutment means in the form of bolt 29, is connected by nut 98' to lever 94 so that this L-shaped bracket will be directly pivoted to bracket 95. This bracket 95 is thus movable and may actuate any suitable movement means designed to actuate any braking system, for application to the rear wheels of the trailer. Again, hydraulic and electrical means of a variety of structures are available and currently on the market place to enable lever movement thereof to actuate hydraulically or electrically, the braking system of the trailer. The winch at W' in FIG. 6 includes this time a cable 99 which loops about idler pulleys 100, 101 and 102 in the manner indicated, and wraps about winch drum 103. The latter is provided with a keyed shaft 104 that may be provided with a wrench-receiving end 105, the same replacing handle 56 in FIG. 2. The winch drum may be provided this time with an L-shaped pin-type detent 107 having a chamfered end and engaging a selected hole 108 of the winch drum 103.

Figure 7:
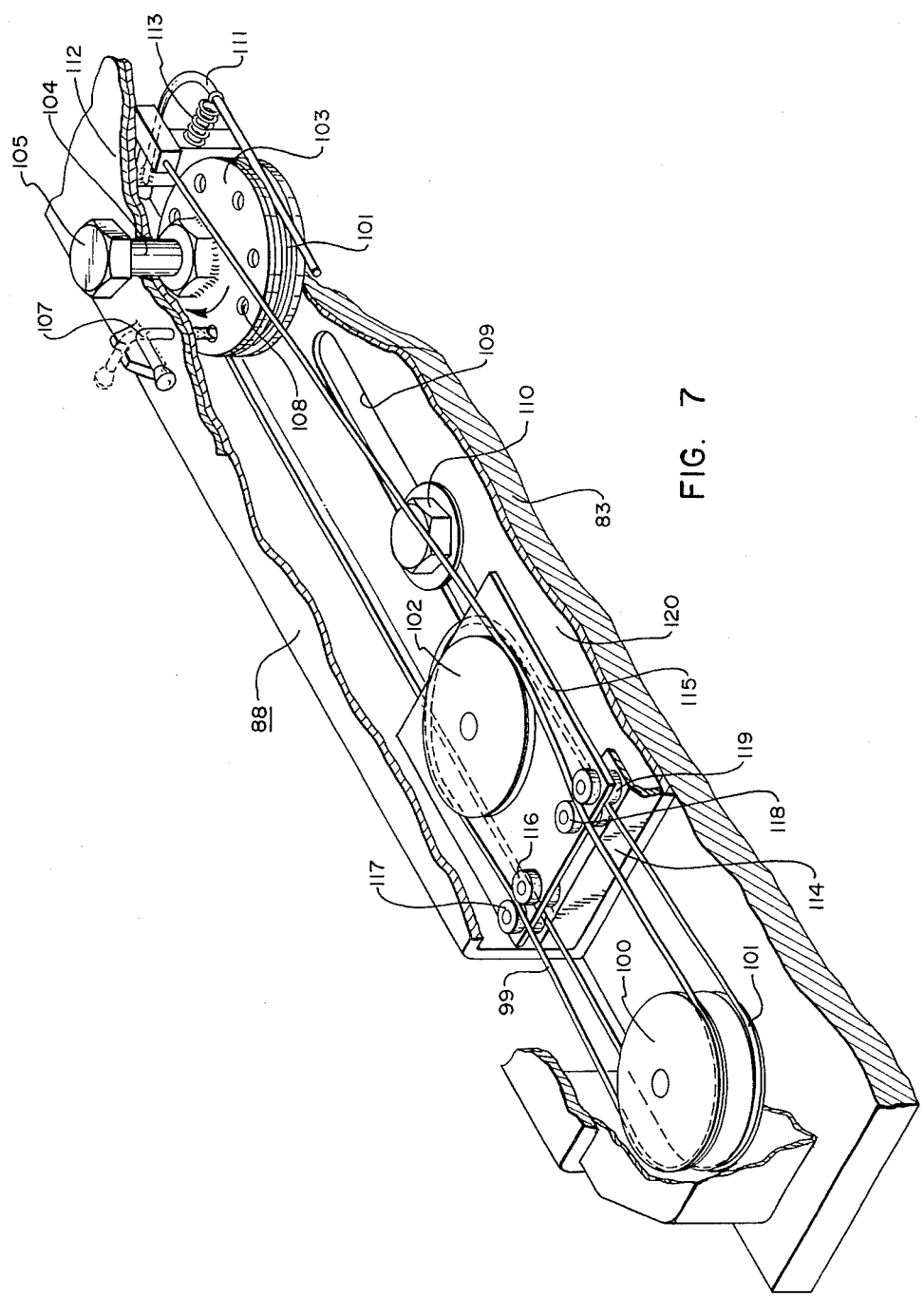
FIG. 7 is an enlarged perspective view of a portion of the structure of FIGS. 5 and 6, illustrating the pulley and winch cable construction.

FIG. 7 indicates that the tongue 88 is provided with a base slot 109 which receives a pin or bolt 110 that is secured to drawbar 83. Accordingly, the tongue 88 is free to slide in and out relative to the drawbar and also is pivotal about the pivot bolt 110 secured to the drawbar. Thus, the dotted line configurements shown in FIG. 5, or any configurement disposed therebetween are possible; hence, the tongue is both extensible and also laterally displaceable, by way of pivoting so that the bar receiver 89 may be brought in vertical alignment with the ball hitch of the towing vehicle.

Relative to the winch drum 103 of FIG. 7, there may be provided a spring-loaded finger comprising simply a thick wire 111 which is anchored by nut 112 and includes a retention spring 113 for insuring that the wire or finger presses against the outer windings 101, wound upon the winch drum 103. If desired, the cable connector 99 may include a takeup spring. Optionally, none such need be required and the cable will simply be wound up as the winch drum is turned.

Bracket 114 is provided and fixedly mounts plate 115 to tongue 88. Plate 115 carries idle pulleys 116–119 for the various cable runs; it will be noted that the plates 115 is thus fixedly disposed and secured to tongue 88 at the underside 120 thereof in the manner shown.

While the structure of FIG. 5–7 operates identically with that shown in FIGS. 1–4, the exception at this time is that the winch drum is now turned by a wrench, not shown, as applied to the wrench flat connector 105 in FIG. 7. The cable now is used in lieu of a chain or sprocket, and the braking system operates as before excepting that the levers have been slightly rearranged to provide for the movement shown by the arrows A and A' in FIG. 5. Handle H is provided the ball receiver 89 as is conventional.

Accordingly, what is provided is a new and improved hitch construction of a split, articulative construction such that the tongue thereof may be withdrawn, extended, moved side to side as necessary to accommodate an exact placement over the connecting ball of the trailer. Once the hitch is in fact connected at the power receiver to the ball of the tractor, then the winch drum is turned so as to wind the cable in the case of the embodiments shown in FIGS. 5–7, or to wind the chain of the embodiments of FIGS. 1–4A so that the tongue is retracted to and over the drawbar of the hitch in true retracted position similar to that shown in FIG. 3.

While a winch or capstan construction is desired, there are other ways, of course, of drawing up the tongue relative to the drawbar as by way of a rack and pinion combination, or by other conventional means.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. An extensible and retractable, split hitch construction including, in combination, a drawbar constructed for mounting to a trailer, a movable tongue slideably secured to said drawbar for elongate extension and retraction, said tongue having an elongate hollow interior and an outer extremity provided with a tractor connection, vertical pivot means intercoupling said tongue to said drawbar for enabling the horizontal pivotal displacement of said tongue relative to said drawbar, on opposite sides thereof, when said tongue is in an extended position, first means for constraining said tongue to axial alignment with said drawbar when said tongue is in a retracted position relative to said drawbar, second means for releasably securing said tongue to said drawbar in a retracted position, and third means intercoupling said tongue to said drawbar for selectively mechanically pulling said tongue toward retracted position relative to said drawbar, said third means comprising a flexible elongate connector, constrained within said hollow interior of said tongue and extending rearwardly thereof and anchored to said drawbar and a winch carried by said movable tongue and operatively engaging said flexible elongate connector.

2. The combination of claim 1 wherein said drawbar includes an axial, elongate end slot, said tongue having a vertical fin disposed for retentive travel in said end slot.

3. The combination of claim 1 wherein said drawbar is provided with a spring-loaded movable abutment means engaging said tongue when said tongue is in a fully retracted position relative to said drawbar.

4. The combination of claim 1 wherein said flexible elongate connector comprises a winch chain.

5. The combination of claim 1 wherein said tongue is tubular, said flexible elongate connector passing essentially axially through said tongue.

6. The combination of claim 1 wherein said winch includes a winch drum provided with a winch revolving wrench connection.

7. An extensible and retractable, split hitch construction including, in combination, a drawbar constructed for mounting to a trailer, a tongue slideably secured to said drawbar for elongate extension and retraction, said tongue having an outer extremity provided with a tractor connection, pivot means intercoupling said tongue to said drawbar for enabling the pivotal displacement of said tongue relative to said drawbar when said tongue is in an extended position, first means for constraining said tongue to axial alignment with said drawbar when said tongue is in a retracted position relative to said drawbar, second means for releasably securing said tongue to said drawbar in a retracted position, third means intercoupling said tongue to said drawbar for selectively mechanically pulling said tongue toward retracted position relative to said drawbar, said tongue being provided with a pivotal lever releasably receiving said second means and also a fixed connection, and a resilient load carrying means coupled at opposite extremities to said pivotal lever and said fixed connection.

8. An extensible and retractable, split hitch construction including, in combination, a drawbar constructed for mounting to a trailer, a movable tongue slideably secured to said drawbar for elongate extension and retraction, said tongue having an outer extremity provided with a tractor connection, pivot means intercoupling said tongue to said drawbar for enabling the pivotal displacement of said tongue relative to said drawbar when said tongue is in an extended position, first means for constraining said tongue to axial alignment with said drawbar when said tongue is in a retracted position relative to said drawbar, second means for releasably securing said tongue to said drawbar in a retracted position, and third means intercoupling said tongue to said drawbar for selectively mechanically pulling said tongue toward retracted position relative to said drawbar, said third means comprising a flexible elongate connector anchored to said drawbar and a winch carried by said movable tongue and operatively engaging said flexible elongate connector, and wherein said flexible elongate connector is provided with spring means anchored to said tongue for providing a spring-takeup for said connector during retraction of said tongue relative to said drawbar.

9. An extensible and retractable, split hitch construction including, in combination, a drawbar constructed for mounting to a trailer, a tongue slideably secured to said drawbar for elongate extension and retraction, said tongue having an outer extremity provided with a tractor connection, pivot means intercoupling said tongue to said drawbar for enabling the pivotal displacement of said tongue relative to said drawbar when said tongue is in an extended position, first means for constraining said tongue to axial alignment with said drawbar when said tongue is in a retracted position relative to said drawbar, second means for releasably securing said tongue to said drawbar in a retracted position, third means intercoupling said tongue to said drawbar for selectively mechanically pulling said tongue toward retracted position relative to said drawbar, wherein said drawbar is provided with a spring-loaded movable abutment means engaging said tongue when said tongue is in a fully retracted position relative to said drawbar, and wherein said drawbar is provided with brake actuating means, responsive to a predetermined pressure of said tongue against said drawbar abutment means, for external brake application to external trailer load as is towed by said hitch.

10. The combination of claim 9 wherein said brake actuating means includes a brake applicator lever, and a lever actuator intercoupling said movable abutment means with said brake application lever.

11. An articulative split-hitch construction including, in combination, a drawbar constructed for connection to an external trailer, a tongue having a hollow interior and a forward extremity provided with a tractor towing connection, first means for articulatively mounting said tongue to said drawbar for both slideable and pivotal movement about a vertical axis with respect thereto for selective disposition horizontally on opposite sides thereof, second means intercoupling said tongue with said drawbar for retractively drawing said tongue and drawbar together in retracted, essentially axial alignment, said second means comprising a winch carried by said tongue and a flexible elongate connector constrained within said hollow interior of said tongue and extending rearwardly thereof and anchored to said drawbar and operatively engaged by said winch, and means for constraining said tongue to essentially axial alignment relative to said drawbar when said tongue is coming into retracted position relative to said drawbar.

* * * * *